July 22, 1958 C. E. POEHLS 2,843,991
ROTARY CUTTER AND SHREDDER
Filed June 27, 1956 2 Sheets-Sheet 1

INVENTOR.
CLARENCE E. POEHLS
BY
Wheeler, Wheeler & Wheeler
ATTORNEYS

July 22, 1958   C. E. POEHLS   2,843,991
ROTARY CUTTER AND SHREDDER

Filed June 27, 1956   2 Sheets-Sheet 2

INVENTOR.
CLARENCE E. POEHLS
BY
Wheeler, Wheeler + Wheeler
ATTORNEYS

United States Patent Office 2,843,991
Patented July 22, 1958

2,843,991

ROTARY CUTTER AND SHREDDER

Clarence E. Poehls, Algoma, Wis., assignor to Algoma Foundry & Machine Company, Algoma, Wis., a corporation of Wisconsin Application June 27, 1956, Serial No. 594,203

3 Claims. (Cl. 56—23)

This invention relates to a rotary cutter and shredder.

Rotary mowers are in common use both for mowing lawns and for agricultural mowing. However, there has not heretofore been any satisfactory way in which the cuttings could be collected instead of being discharged back onto the soil. It is particularly important to be able to collect the cuttings when the machine is used for agricultural purposes, since the harvesting of the crop is generally the objective of the mowing operation.

The present invention is based on the discovery that there is a particular relationship between a cutter housing and a blower housing which is ideal to enable the cuttings to be delivered pneumatically into a vehicle towed behind the harvester. The cutter rotates on an axis which is at least approximately vertical so that the plane of rotation of the cutter blades is at least approximately horizontal. In the specific embodiment disclosed, a housing which supports the cutter shaft is arranged to be towed behind a tractor or the like, the cutter shaft being driven from the tractor power take-off. The preferred arrangement of the blower is in a vertical plane at one side of the drive shaft so that an extension of the drive shaft from the power take-off can be geared to the generally horizontal blower shaft. A volute extension opening approximately tangentially behind the cutter blades guides the clippings curvilinearly into an opening provided below the blower shaft in the casing which surrounds the blower. The generally tangential discharge outlet from this casing may extend in any desired direction, the disclosed arrangement being such that the discharge is vertically upward. This permits the use of a curved delivery pipe from which the clippings are pneumatically discharged into a receiving vehicle which may be towed behind the harvester.

Figures 1, 2:
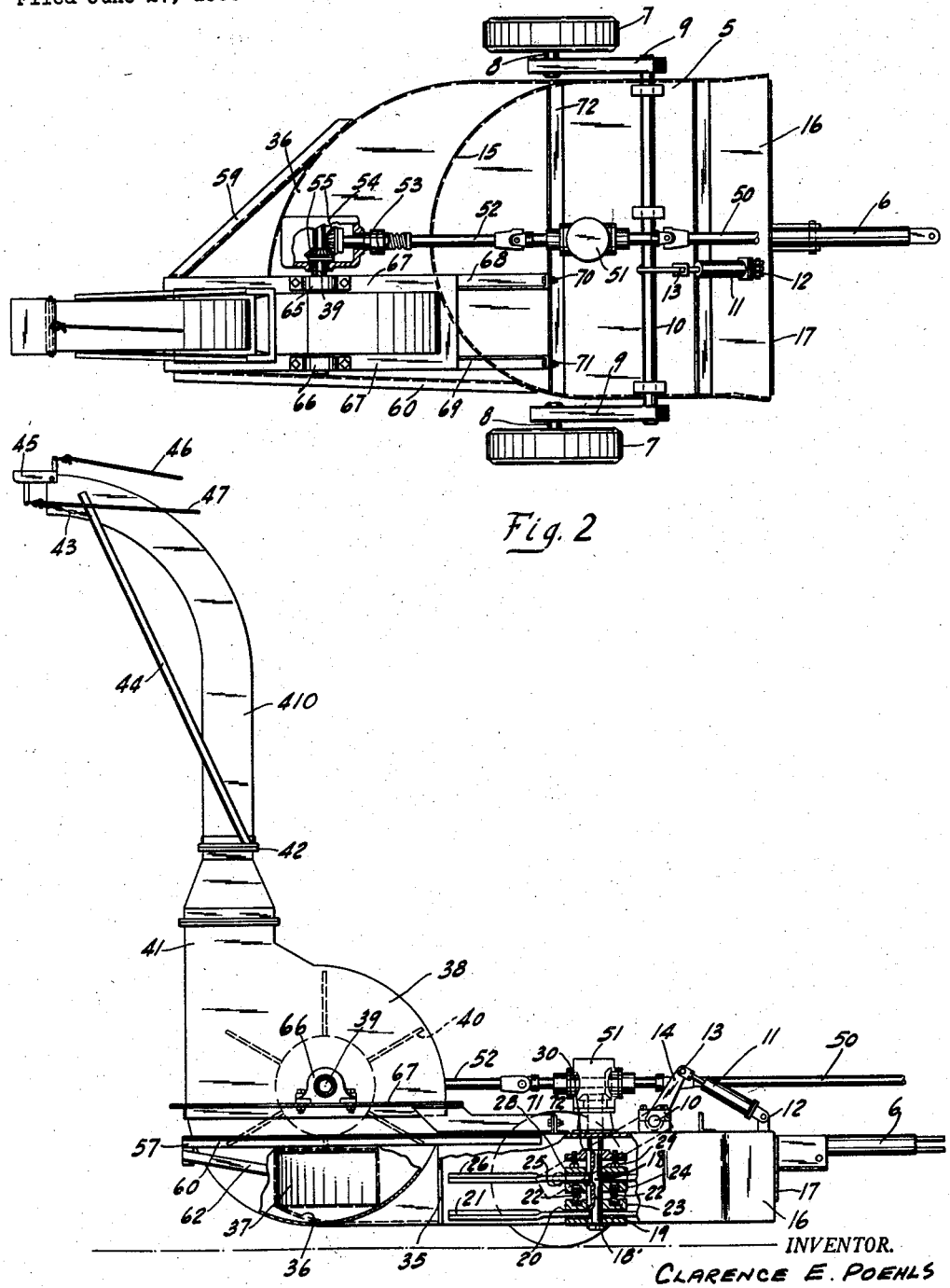
Fig. 1 is a view of a device embodying the invention as it appears partially in side elevation and partially in section.
Fig. 2 is a plan view of the device shown in Fig. 1, portions being shown in section.

The housing 5 for the rotary mower also serves as a frame for the device. It is provided with a tow bar 6 for tractor attachment. It has independent support from the ground by means of wheels 7 rotatable on stub axles 8 at the ends of rocker arms 9 which are fixed to a rock shaft 10 for which the housing provides bearings. The jack 11 has one end pivoted to the housing at 12 and the other end pivoted at 13 to the arm 14 of rock shaft 10 whereby the height of the housing may be adjusted with respect to the wheels not only to vary the height of the cut made by the mower but to enable the device to be lifted sufficiently for ready transportation to and from the place of use.

The shape of housing 5 is broadly immaterial to the present invention. As shown, it has a generally semi-circular rear wall at 15 and its forward end includes a slightly tapered throat at 16 partially closed by a protective baffle at 17 as best shown in Fig. 1.

Figure 4:
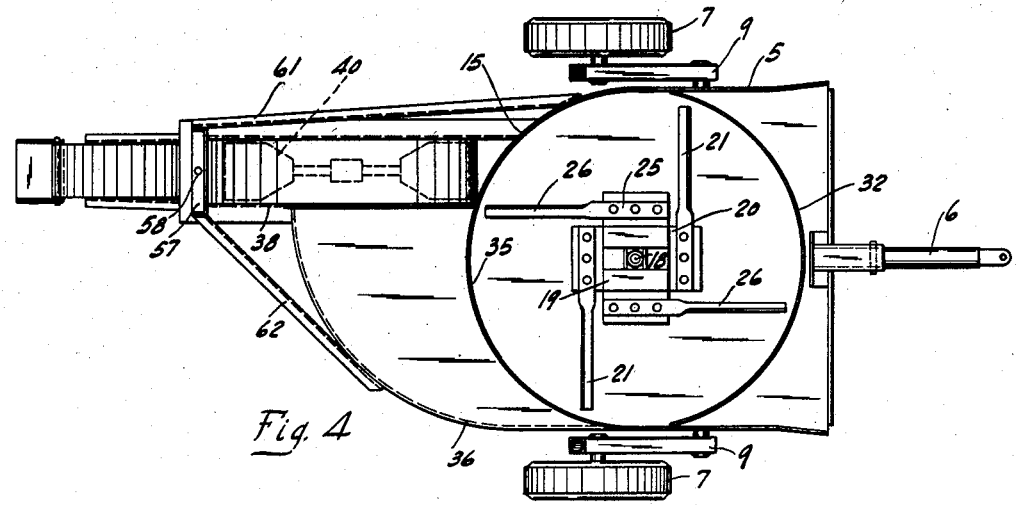
Fig. 4 is a bottom plan view of the device.
Figure 5:
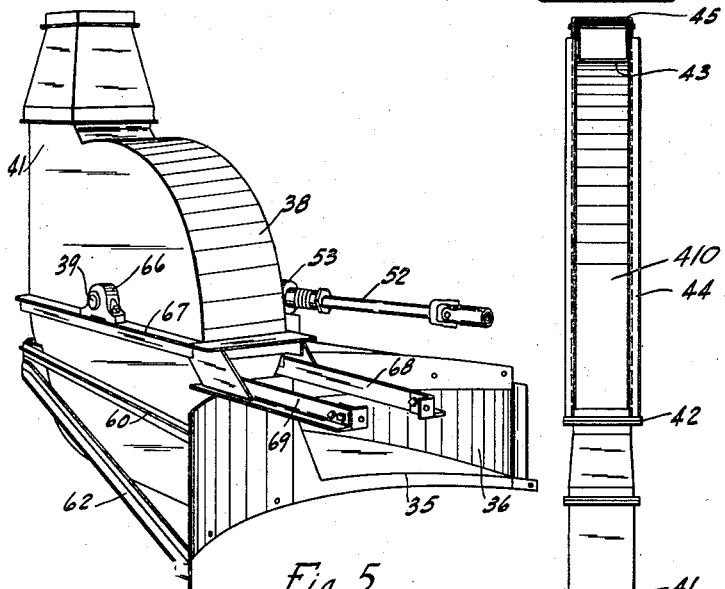
Fig. 5 is a view in perspective of the base unit of the blower attachment.
Figure 3:
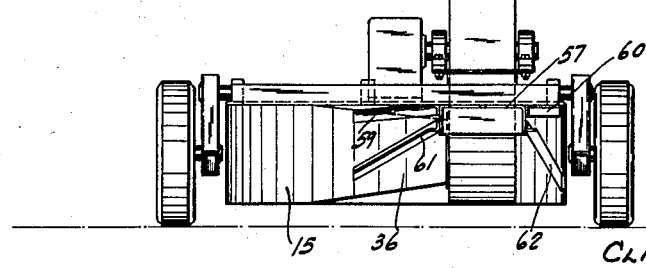
Fig. 3 is a view of the device in rear elevation.

Suitably journaled substantially concentrically with the semi-circular rear wall 15 is a cutter shaft 18 headed at 18' at its lower end for the support of a plate 19 keyed to the cutter shaft. This plate supports a cutter head 20 from which project the mower blades 21. It is broadly immaterial how many such blades are provided or how they are mounted. In the particular device illustrated, the plate 19 is square and the head 20 is oblong with one of the blades 21 mounted across each of its ends. The head 20 is not fixed to the shaft but is clamped against plate 19 by compression springs 22 which are confined between plates 23 and 24, these desirably being keyed to the cutter shaft. Plate 24 supports another cutter head 25, likewise oblong as shown, across the ends of which are mounted blades 26. The upper cutter head 25 is confined between the spring-biased plate 24 and an upper plate 28, likewise keyed to the cutter shaft. The degree of spring pressure is regulated by adjusting the screws 29 in the top plate 30 fixed to the cutter shaft, all as best shown in Fig. 1. Since nothing other than friction constrains the cutter heads to rotate with the cutter shaft, it will be understood that they may not continue to be symmetrically disposed as illustrated in Fig. 4. Desirably, although not necessarily, the blades rotate in close proximity to the arcuate rear wall 15 and a similarly arcuate wall 32 provided within the housing 5 to define a generally cylindrical cutter chamber as shown in Fig. 4. As viewed in Fig. 4, the direction of rotation is clockwise. As viewed in Fig. 2, the direction of rotation is counterclockwise.

The two sets of blades shown at 21 and 26 at differing levels, tend to cut long produce into short lengths. The severed crop material passes tangentially through the opening 35 in the arcuate rear wall 15 of the cutter housing 5 into the detachable arcuate wall 36 which comprises an extension from the cutter housing and defines a generally volute passage which leads, with successively decreasing height, into the inlet port 37 of the blower housing 38. This port is located well below the transverse shaft 39 which supports a more or less conventional rotor 40. The tangential discharge port 41 receives a current of air and entrained cut crop material for pneumatic delivery of the material through the discharge pipe 410. In practice, it is preferred that this be swiveled at 42 for rotation on its axis so that the curved upper end portion 43 of the delivery pipe may be directed as desired. From the swivel bearing at 42 the upper end portion 43 is desirably braced at 44. Delivery from the pipe may be temporarily cut off by means of the valve or gate 45 opened by rope 46 and closed by rope 47, both leading to a suitable point of control, usually convenient to the driver of the tractor (not shown).

A conventional universally jointed drive shaft 50 leads from the usual tractor power take-off and connects to a gear box at 51 from which the cutter shaft 18 is driven. Extension shaft 52 continues beyond the gear box 51 through an overload clutch at 53 to a gear box 54 wherein power is communicated through the bevel gear set 55 to the lower shaft 39.

In extensive testing, it has been found that the illustrated position of the blower in a vertical plane offset from the center line of the rotary mower at the side toward which the mower blades rotate produces markedly superior results as compared with various other blower locations. It will be observed that in the preferred embodiment illustrated, the mower housing is not provided with a false bottom of any sort but is wide open to the ground. It has been found that without any bottom in this chamber, substantially all harvested material is delivered through the volute passage of extension 36 into the blower. The disposition of this passage with respect to the cutter housing is such that the severed material passes from the mower housing with only gradual change of direction and with a minimum travel, thereby reducing the power requirements. Similarly, movement of the material into the blower is effected with minimum change of direction and considerably less power than is required in other organizations tested. The fact that the blower inlet port 37 is below the shaft 39 of the blower not only facilitates the movement of material and its discharge from the blower in about 90° of rotation, but further disposes the blower shaft in a position where the delivery of power thereto through the gearing 55 is simple and direct.

Disposed behind the blower housing is a coupling member 57 having an aperture 58 to receive a draw bar coupling for the tow bar or tongue of the vehicle which is to receive the harvested crop material. Bracing at 59, 60, 61 and 62 not only rigidifies the connection of the blower housing to the mower housing 5 (which serves as a frame) but provides adequate strength for towing the receiving vehicle (not shown).

It is to be understood that a harvester or rotary mower unit is an item commercially available on the open market and normally closed at its rear. The present invention can, therefore, be made available by supplying the blower and the extension 36 which provides the inlet passage and its mounting and bracing members as an attachment for existing harvesters of this type.

It will be observed that the bearings 65 and 66 for the blower shaft 39 are seated on a sub-frame 67 which encircles the blower casing 38 and is supported on angles 68 and 69 bolted at 70 and 71 to the cross member 72 of mower housing 15. The volute wall of extension 36 bolts to the housing of the mower as do the upper and lower braces 60 and 62 to complete the mechanical assembly. The shaft 52 is made up in readily separable universally jointed sections as shown. It is, therefore, a matter of only a few minutes to connect or disconnect the blower attachment.

I claim:

1. The combination with a rotary mower comprising a generally upright mower shaft provided with blades which describe a substantially horizontal circular path in the course of shaft rotation, a housing enclosing said blades and having means defining a discharge passage opening from said housing and extending approximately tangentially from said path, and a generally cylindrical blower housing with a substantially tangential outlet duct and having a blower shaft and rotor operatively mounted for rotation therein, said housing being disposed in a generally upright plane which lies substantially on a chord of said path and having an inlet at a level below the axis of said rotor and to which said passage-defining means extends.

2. The device of claim 1 in which the mower housing is provided with oppositely disposed supporting wheels and the blower housing is mounted thereon, the mower housing being substantially cylindrical and said discharge-passage-defining means opening from the side of the blower housing near one of said wheels and extending transversely to the blower housing, the blower housing extending in a generally fore and aft direction and being disposed adjacent the other side of the mower housing from said one wheel.

3. The device of claim 1 in which the blower housing has a sub-frame detachably mounted on the mower housing, said mower housing having wheels supporting both housings, and means providing driving connections to the mower shaft and the blower shaft.

References Cited in the file of this patent

UNITED STATES PATENTS

| | | |
|---|---|---|
| 2,351,830 | Mitchell et al. | June 20, 1944 |
| 2,701,942 | Caldwell et al. | Feb. 15, 1955 |